No. 735,155. Patented August 4, 1903.

UNITED STATES PATENT OFFICE.

GUSTAF OSCAR ROSENLEAF, OF MUSCATINE, IOWA.

FIREPROOF COMPOUND.

SPECIFICATION forming part of Letters Patent No. 735,155, dated August 4, 1903.

Application filed April 20, 1903. Serial No. 153,550. (No specimens.)

*To all whom it may concern:*

Be it known that I, GUSTAF OSCAR ROSENLEAF, a citizen of the United States, residing at Muscatine, in the county of Muscatine and State of Iowa, have invented a new and useful Fireproof Compound, of which the following is a specification.

This invention relates to fireproof compounds for use in buildings.

The object of the invention is to provide a plastic compound of cheap composition which effectively resists the action of fire and which may be used as filling for walls or as means for constructing the body of the wall itself.

In preparing the compound the mode of procedure is as follows: Sawdust is first thoroughly moistened with water containing a quantity of blue vitriol or copper sulfate dissolved therein in the proportion of one pound of blue vitriol to every ten pounds of sawdust. The quantity of water used is just sufficient to thoroughly moisten the sawdust. With the moistened sawdust I then mix an equal quantity, by volume, of a mixture consisting of equal parts of sand and any good cement or plaster. The moistened sawdust and the mixture of sand and plaster are thoroughly commingled in any suitable apparatus, and when the mixing is completed the plastic mass is in condition for use.

When used for filling walls, the studding is first boarded up on the outside, and the building compound in the condition just described is packed between the studding against the boarding on the outer surface thereof and pressed hard against the studding and boarding, so as to completely fill all the crevices of the wall. The inner surface of the wall is then boarded up over the filling of plastic material. The filling of the wall is of course begun at the bottom, and the boarding up of the inner surface of the wall is carried on simultaneously with the packing in of the material between the studding in order to prevent the plastic material at the bottom from being forced outward by the weight of the material added above.

The boarding on the inner surface of the wall, while necessary during the filling process, may be removed after the plastic compound has solidified, and the inner surface of the filling may then be finished in any desired manner.

If it is desired to form the wall entirely of the plastic material with the exception of the studding, the mode of procedure is similar, except that the boarding on the outside is only temporary and is to be removed after the material has hardened. The outer surface is then finished off with stucco or any other suitable form of surface plaster.

The walls made of my building compound are fireproof, are sufficiently elastic not to crack, and are effective in excluding cold. After the material has hardened it is unaffected by water and will take plaster without the use of laths thereon.

Having thus described my invention, what I claim as new, and desire to secure by Letters Patent, is—

1. The composition of matter consisting of equal volumes of sawdust thoroughly moistened with the solution of blue vitriol and a mixture containing sand and cement.

2. The composition of matter consisting of sand twenty-five per cent. by volume, cement twenty-five per cent. by volume and sawdust moistened by a solution of blue vitriol fifty per cent. by volume.

3. The composition of matter consisting of equal volumes of sawdust moistened with a solution of blue vitriol, containing one part of blue vitriol for ten parts of sawdust and a mixture containing equal parts by volume, of sand and cement.

In testimony that I claim the foregoing as my own I have hereto affixed my signature in the presence of two witnesses.

GUSTAF OSCAR ROSENLEAF.

Witnesses:
JOHN W. RICHARDS,
C. W. CHAPMAN.